United States Patent [19]
Neibecker et al.

[11] Patent Number: 6,150,734
[45] Date of Patent: *Nov. 21, 2000

[54] ELECTRICAL DISTRIBUTION SYSTEM

[75] Inventors: Niels Neibecker, Cologne; Peter Stadler, Wenden; Thomas Stein, Kleinmaischeid; Klaus Hold, Wuppertal, all of Germany

[73] Assignee: Delphi Technologies, Inc., Troy, Mich.

[*] Notice: This patent is subject to a terminal disclaimer.

[21] Appl. No.: 09/270,615

[22] Filed: Mar. 17, 1999

Related U.S. Application Data

[63] Continuation-in-part of application No. 09/037,820, Mar. 10, 1998, Pat. No. 5,973,409.

[30] Foreign Application Priority Data

Mar. 30, 1998 [GB] United Kingdom ............... 980675

[51] Int. Cl.[7] ............................................. B60L 1/00
[52] U.S. Cl. .................................................. 307/10.1
[58] Field of Search ............................ 307/10.1, 9.1, 307/147; 361/600, 601, 622, 624, 626, 628, 629, 630, 631, 641, 642, 643, 644, 646, 647, 648, 659, 663, 668, 669, 706, 720, 735, 736, 752, 775, 784, 785; 174/72 B

[56] References Cited

U.S. PATENT DOCUMENTS

| | | | |
|---|---|---|---|
| 5,734,558 | 3/1998 | Poplawski et al. | 361/752 |
| 5,986,880 | 11/1999 | Santeler et al. | 361/785 |
| 6,005,776 | 12/1999 | Holman et al. | 361/735 |

*Primary Examiner*—Josie Ballato
*Assistant Examiner*—Rios Roberto
*Attorney, Agent, or Firm*—Jimmy L. Funke

[57] ABSTRACT

An electrical distribution system that provides a modular arrangement for power and signal distribution in a motor vehicle includes a power distribution circuit board connected to a power supply and to at least one electrical load, switch and control circuit boards electrically connected with the power distribution board via fuses or circuit breakers, and signal distribution devices mounted on the switch and control boards for transmitting control signals between the switch and control boards. The power distribution board includes switching devices for electrically coupling the power supply to the electrical load, the control board has a processor for controlling the operation of the switching devices based on signals received via an external connector.

11 Claims, 1 Drawing Sheet

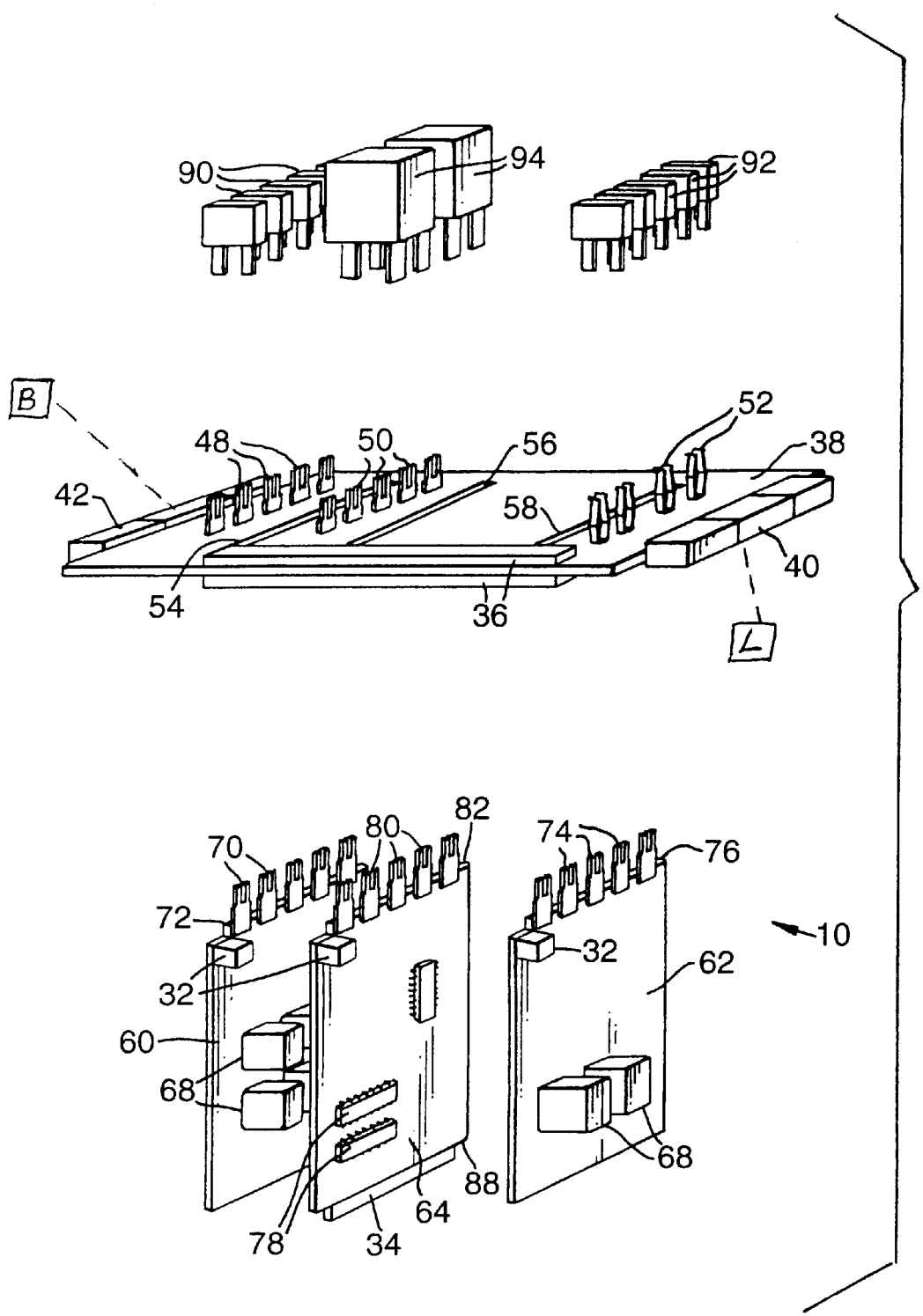

ELECTRICAL DISTRIBUTION SYSTEM

RELATED APPLICATIONS

This application is a continuation-in-part of the patent application U.S. Ser. No. 09/037,820, filed on Mar. 10, 1998, issued on Oct. 26, 1999 as U.S. Pat. No. 5,973,409.

TECHNICAL FIELD

The present invention relates to an electrical distribution system for a motor vehicle which is used for the distribution of both electrical power and electrical signals.

BACKGROUND OF THE INVENTION

Currently, in motor vehicles, electrical power distribution and electrical signal distribution are in general isolated from one another, and/or are provided by numerous separate systems. This leads to complicated wiring harness designs, difficulties in installation in the motor vehicle, and a multitude of system casings and set-ups.

SUMMARY OF THE INVENTION

It is an object of the present invention to simplify the electrical distribution within a motor vehicle.

An electrical distribution system for a motor vehicle in accordance with the present invention comprises a power distribution board having an electrical connection means for connection to a power supply and to at least one electrical load; a switch card extending away from, and electrically connectable with, the power distribution board, and having electrically operable switch means mounted thereon for switching the power supplied to the electrical load from the power supply; a control card extending away from, and electrically connectable with, the power distribution board, having an electrical connection means thereon for receiving and transmitting electrical signals, and having control means mounted thereon for controlling the operation of the switch means dependent on signals received at the electrical connection means on the control card; and signal distribution means mounted on the switch card and the control card for the transmission of control signals between the control card and the switch card.

The present invention provides a modular arrangement for power and signal distribution which reduces wiring harness complexity, provides easier installation in a motor vehicle, and enables a reduction in the number of variants.

BRIEF DESCRIPTION OF THE DRAWINGS

The present invention will now be described, by way of example, with reference to the accompanying drawing in which the sole FIGURE is an exploded view of an electrical distribution system in accordance with the present invention.

DESCRIPTION OF THE PREFERRED EMBODIMENT

Referring to the sole FIGURE, the electrical distribution system 10 for use in a motor vehicle comprises a power distribution board 38 having an electrical connector 40,42 at either end. The electrical connector 42 is connectable with the vehicle power supply represented by storage battery B, and the electrical connector 40 is connectable with vehicle electrical loads represented by the electrical load L. Alternatively, both connectors 40,42 may be connected to the battery B and to electrical load L. Further, the connectors 40,42 may be located at other positions on the power distribution board 38. Electrical fuse contacts 48,52 and relay contacts 50 are mounted on the power distribution board 38. These contacts 48–52 are connected to electrical contacts (not shown) in the electrical connectors 40,42 by way of electrically conductive lines (not shown) on the board 38. Openings 54,56,58 are formed in the board 38 adjacent the contacts 48–52 on the board. The power board 38 is preferably a printed circuit board, but may alternatively be formed from stamped metal.

First and second switch cards 60,62 and a control card 64 extend away from the power board 38 in a direction substantially perpendicular to the power board. The cards 60–64 are preferably substantially rigid printed circuit boards. The first and second switch cards 60,62 have one or more relays 68 mounted thereon which are electrically connected with electrically conductive lines (not shown) formed on the cards. Electrical fuse contacts 70 are positioned at one end 72 of the first switch card 60 and are connected with the relays 68 on the first card by way of the lines on the card. When the system 10 is assembled, the fuse contacts 70 project through the opening 54 in the power board 38 and align with the fuse contacts 48 adjacent thereto. Electrical fuse contacts 74 are positioned at one end 76 of the second switch card 62 and are connected with the relays 68 on the second card by way of the lines on the card. When the system 10 is assembled, the fuse contacts 74 project through the opening 58 in the power board 38 and align with the fuse contacts 52 adjacent thereto. The control card 64 has one or more microcomputers 78 mounted thereon which are electrically connected with electrically conductive lines (not shown) formed on the card 64. Electrical relay contacts 80 are positioned at one end 82 of the control card 64 and are connected with the microcomputers 78 on the card by way of the lines on the card. When the system 10 is assembled, the relay contacts 80 project through the opening 56 in the power board 38 and align with the relay contacts 50 adjacent thereto. The lines on the control card 64 extend to the other end 88 of the card and electrically connect with an electrical connector 34 mounted on the control card 64. The electrical connector 34 is connectable with electrical lines within the motor vehicle for signals being transmitted from and received by the system 10 to electrical components in the vehicle.

In use, electrical fuses 90 electrically connect the fuse contacts 48 on the power board 38 with the fuse contacts 70 on the first switch card 60; electrical fuses 92 electrically connect the fuse contacts 52 on the power board 38 with the fuse contacts 74 on the second switch card 62; and relays 94 electrically connect the relay contacts 50 on the power board 38 with the relay contacts 80 on the control card 64. Any suitable mechanical connecting means may additionally be used to mechanically secure the cards 60–64 to the power board 38.

Signal distribution from the control card 64 to the switch cards 60,62, and from the switch cards 60,62 to the control card 64, is by way of signal distribution means 32, 36 mounted on the cards. In one embodiment, the signal distribution means 36 may be an electrical bus, with the corresponding signal distribution means 32 on the cards 60–64 being appropriate electrical connectors which electrically connect with the bus. In an alternative arrangement, the signal distribution means 36 may be an optical light guide, with the signal distribution means 32 on the cards 60–64 being appropriate optical transmitters/receivers which optically connect with the light guide. In a preferred arrangement, as shown, the electrical bus or the optical light guide 36 is mounted on the power distribution board 38.

Alternatively, the bus or light guide 36 may be mounted elsewhere, for example, the inner wall of a casing which surrounds the power board 38 and cards 60–64.

The relays 68,94 may be replaced by any other suitable electrically controllable switching devices, such as MOSFETs. The fuses 90,92 may be replaced by any other suitable overload disconnection system, such as circuit breakers. The microcomputers 78 may be replaced by any other suitable form of logic control means or semiconductor control device. The electrical connectors 34,40,42 may be replaced by any other suitable electrical connection means.

The electrical distribution system 10 of the present invention may be mounted inside a casing substantially as described in the above mentioned U.S. Ser. No. 09/037,820. Alternatively, the power board 38 and each card 60–64 may be mounted inside individual casings which are mechanically connected together to electrically and mechanically connect the cards with the board.

With the present invention, power distribution and signal distribution for a motor vehicle can be combined within a casing which can be assembled before installation on a motor vehicle. Power distribution from a vehicle battery B to the electrical load L in a vehicle is by way of the power board 38, the fuses 90 and the relays 68,94. The microcomputers 78 receive and send signals by way the electrical connector 34 to monitor and control the operation of the relays 68,94, and to monitor and control the operation of other electrical components in the motor vehicle. The present invention therefore provides a modular arrangement for combining power and signal distribution, but maintains isolation between the two distribution systems. Such an arrangement reduces the complexity of vehicle wiring harnesses and provides for easier installation in a motor vehicle. The present invention also lends itself for easy modification dependent on the vehicle within which the system is to be installed, and dependent on customer requirements for the vehicle, thereby reducing variants.

While described in respect to the illustrated embodiment, it is expected that various modification in addition to those mentioned above will occur to those skilled in the art. Accordingly, it will be understood that the scope of the present invention is not limited to the illustrated embodiment, and extends to distribution systems incorporating such modifications.

What is claimed is:

1. An electrical distribution system for a motor vehicle comprising:

a power distribution board having an electrical connection means for connection to a power supply and to at least one electrical load;

a switch card extending away from, and electrically connectable with, the power distribution board, and having electrically operable switch means mounted thereon for switching the power supplied to the electrical load from the power supply;

a control card extending away from, and electrically connectable with, the power distribution board, having an electrical connection means thereon for receiving and transmitting electrical signals, and having control means mounted thereon for controlling the operation of the switch means dependent on signals received at the electrical connection means on the control card; and signal distribution means mounted on the switch card and the control card for the transmission of control signals between the control card and the switch card.

2. The electrical distribution system of claim 1, wherein electrical fuses provide the electrical connection between the switch card and the power distribution board.

3. The electrical distribution system of claim 2, wherein the power distribution board has fuse contacts mounted thereon, and the switch card has corresponding fuse contacts which extend through an opening in the power distribution board.

4. The electrical distribution system of claim 1, wherein electrical relays provide the electrical connection between the control card and the power distribution board.

5. The electrical distribution system of claim 4, wherein the power distribution board has relay contacts mounted thereon, and the control card has corresponding relay contacts which extend through an opening in the power distribution board.

6. The electrical distribution system of claim 1, further comprising:

a second switch card extending away from, and electrically connectable with, the power distribution board, and having electrically operable switch means mounted thereon for switching the power supplied to the electrical load from the power supply; and wherein the signal distribution means includes an electrical bus, and electrical bus connectors mounted on each switch card and on the control card, the electrical bus connectors making an electrical connection with the electrical bus.

7. The electrical distribution system of claim 6, wherein the electrical bus is mounted on the power distribution board.

8. The electrical distribution system of claim 1, wherein the signal distribution means comprises an electrical bus, and electrical bus connectors mounted on the switch card and control card, the electrical bus connectors making an electrical connection with the electrical bus.

9. The electrical distribution system of claim 8, wherein the electrical bus is mounted on the power distribution board.

10. The electrical distribution system of claim 1, wherein the signal distribution means comprises an optical light guide, and an optical receiver/transmitter mounted on the switch card and on the control card, the optical transmitters/receivers making an optical connection with the optical light guide.

11. The electrical distribution system of claim 10, wherein the optical light guide is mounted on the power distribution board.

* * * * *